United States Patent [19]

Sorensen et al.

[11] Patent Number: 5,761,610

[45] Date of Patent: Jun. 2, 1998

[54] METHOD AND APPARATUS FOR DYNAMIC RADIO COMMUNICATION MENU

[75] Inventors: Lars Stig Sorensen, Palatine; Timothy Mark Garton, Cary; Mark A. Kapouralos, Palatine; Kenneth W. Douros, Hoffman Estates, all of Ill.

[73] Assignee: Motorola, Inc., Schaumburg, Ill.

[21] Appl. No.: 663,746

[22] Filed: Jun. 18, 1996

Related U.S. Application Data

[63] Continuation of Ser. No. 308,899, Sep. 20, 1994, abandoned.

[51] Int. Cl.$^6$ .................................................. H04B 1/38
[52] U.S. Cl. ............................. 455/89; 455/95; 455/154.2
[58] Field of Search .......................... 455/89, 95, 154.2, 455/186.1, 186.2; 379/58, 59, 96, 354, 355; 345/146, 168, 169, 902

[56] References Cited

U.S. PATENT DOCUMENTS

| 5,134,717 | 7/1992 | Rasmussen | 455/89 |
| 5,258,748 | 11/1993 | Jones | 345/172 |
| 5,381,461 | 1/1995 | Baals et al. | 379/354 |
| 5,386,460 | 1/1995 | Boakes et al. | 345/902 |

FOREIGN PATENT DOCUMENTS

| 0583077A | 2/1994 | European Pat. Off. |
| 4116057C | 6/1992 | Germany. |
| 4202040A | 7/1993 | Germany. |

OTHER PUBLICATIONS

WordPerfect Version 6.0 Windows Users Guide, pp. 224/251 "Button Bar"& Button Bar Editor. WordPerfect Corporation 1994.

Macintosh User's Guide for desktop Macintosh®computers, "Chapter 10: Organizing Your Files", pp. 112–120. Apple Computer, 1991.

*Primary Examiner*—Reinhard J. Eisenzopf
*Assistant Examiner*—Marsha D. Banks-Harold
*Attorney, Agent, or Firm*—Randall S. Vaas

[57] ABSTRACT

A radio communication device menu system includes a memory (232) storing menu items. A controller (220) is coupled to the memory. A user controlled input (106) is coupled to the controller for manually inputting control signals to the controller. A display (108) is also coupled to controller to display signals from the controller. The memory includes a short menu and an extended menu. The controller is responsive to a predetermined actuation pattern of the user controlled input to select one of the extended and short menus as the active menu, and for scrolling through the selected one of the short and the extended menus. According to another aspect of the device, the user controlled input includes a clear key which is held for a first predetermined time period to return to a higher level in the active menu and the clear key is held for a second predetermined time period to exit the active menu.

13 Claims, 15 Drawing Sheets

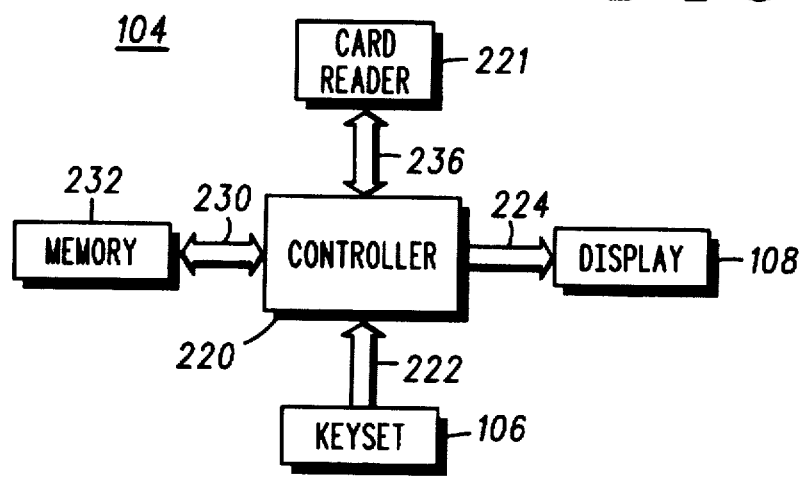
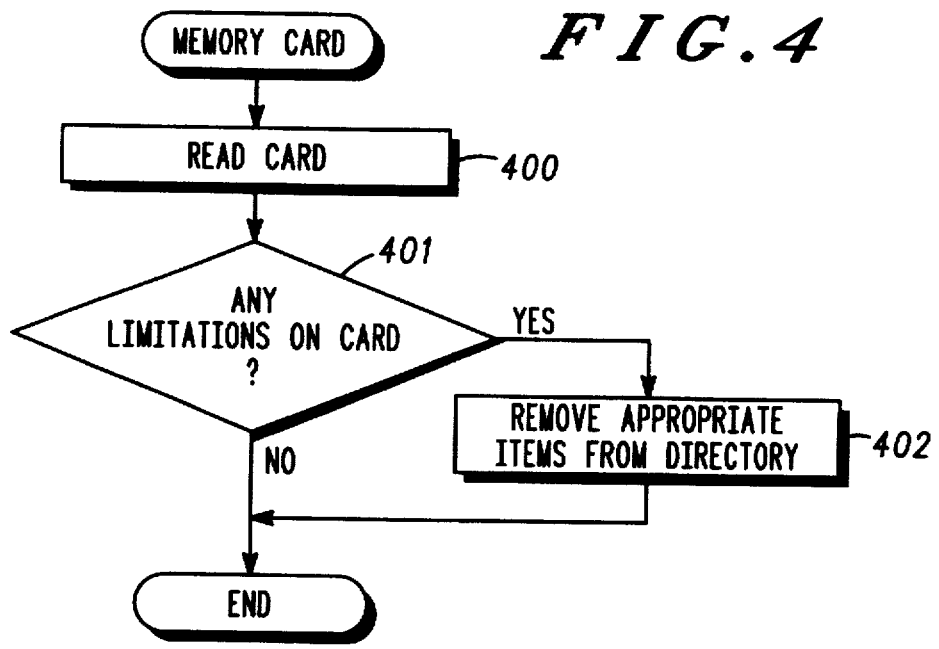

FIG. 3A

| CALL RELATED FEATURES | PHONE SETUP | MESSAGES | PHONE BOOK | NETWORK SELECTION | CALL METERS | ACCESSORY SETUP |
|---|---|---|---|---|---|---|
| LAST TEN CALLS | INCOMING CALL ALERT | INCOMING CALL ALERT | FIND BY NAME | AVAILABLE NETWORKS | SHOW LAST CALL | MUTE CAR RADIO |
| CALLS MADE | RINGS ONLY | RECEIVED MESSAGES | FIND BY LOCATION | REGISTER NOW | RESETTABLE CALL METERS | ON |
| CALLS RECEIVED | VIBRATE ONLY | CALL BROADCAST | SHOW MY PHONE NUMBER | MAKE PREFERRED | SHOW TOTAL CALLS | OFF |
| RESTRICT BY PHONE NUMBER | NO RING/VIB. | ON | ADD ENTRY | NETWORK SEARCH | SHOW HOME CALLS | AUTOMATIC ANSWER |
| PRESENT ID NEXT CALL | ADJUST RING VOLUME | OFF | ADD TO PHONE MEMORY | REGISTRATION PREFERENCE | SHOW ROAMING CALLS | ON |
| RESTRICT ID NEXT CALL | HIGH | MESSAGE SETTINGS | ADD TO SIM CARD MEMORY | AUTOMATIC | RESET ALL METERS | OFF |
| CALL DIVERTING | MEDIUM | MESSAGE ALERT TONE | CHECK CAPACITY | MANUAL | SET AUDIBLE CALL TIMERS | AUTOMATIC HANDSFREE |
| DIVERT WHEN UNAVAILABLE | LOW | ON | CHECK PHONE CAPACITY | SEARCH FREQUENCY | SINGLE ALERT TIMER | ON |
| ON(EP1) | PHONE LOCK | OFF | CHECK SIM CAPACITY | PERIODIC | ON(EP3) | OFF |
| OFF | AUTOMATIC LOCK(EP2) | VOICE MAIL NUMBER | PREVENT ACCESS | CONTINUOUS | OFF | SAFETY TIMER |
| DETAILED DIVERTING | ON | | TO PHONE MEMORY | PREFERRED NETWORKS | REPETITIVE TIMER | ON |
| DIVERT ALL VOICE CALLS | OFF | | TO SIM CARD MEMORY | ADD NETWORK TO LIST | ON(EP3) | ON(EP6) |
| ON(EP1) | LOCK NOW(EP2) | | TO PHONE AND SIM MEMORY | CHOOSE FROM AVAILABLE | OFF | OFF |
| OFF | CHANGE UNLOCK CODE | | | CHOOSE FROM KNOWN | SHOW METER DURING CALLS | AUXILIARY ALERT |
| IF BUSY | REQUIRE SIM CARD PIN | | | ADD NEW NETWORK CODE | ON | ON |
| ON(EP1) | ON | | | SHOW NETWORKS | OFF | OFF |
| OFF | OFF | | | MOVE TO NEW LOCATION | SET METER FORMAT | |
| IF NO ANSWER | CHANGE PIN CODE | | | DELETE SELECTION | COST OF CALLS | |
| ON(EP1) | CHANGE SECURITY CODE | | | FIND NEW NETWORK | TIME OF CALLS | |
| OFF | EXTENDED MENU | | | | SET CALL COST RATES | |
| IF NOT RECEIVED | ON | | | | HOME RATE(EP4) | |
| ON(EP1) | OFF | | | | ROAM RATE(EP4) | |
| OFF | LANGUAGE SELECTION | | | | SHOW LIFETIME METER | |
| DIVERT FAX CALLS | DANISH | | | | | |
| ON(EP1) | DUTCH | | | | | |
| OFF | ENGLISH | | | | | |
| DIVERT DATA CALLS | FINNISH | | | | | |
| ON(EP1) | FRENCH | | | | | |
| OFF | GERMAN | | | | | |
| CANCEL ALL DIVERTING | GREEK | | | | | |
| CALL WAITING | HUNGARIAN | | | | | |
| ON | ITALIAN | | | | | |
| OFF | NORWEGIAN | | | | | |
| CALL BARRING | PORTUGUESE | | | | | |
| OUTGOING CALLS | SPANISH | | | | | |
| INT'L CALLS | SWEDISH | | | | | |
| | TURKISH | | | | | |
| | AUTOMATIC | | | | | |
| | CHANGE GREETING(EP3) | | | | | |
| | BATTERY SAVING MODE | | | | | |

FIG. 3B

| CALL RELATED FEATURES (CONTINUED) | INT'L CALLS EXCEPT HOME<br>ALL CALLS<br>TURN OFF CALL BARRING<br>INCOMING CALLS<br>WHEN ROAMING<br>BARRING ALL CALLS<br>OFF<br>CHANGE BARRING PASSWORD |
|---|---|
| CALL RESTRICTIONS | KEYPAD DIALING<br>ON<br>OFF<br>PHONE NUMBER LENGTH<br>ON(EP7)<br>OFF<br>INCOMING CALLS<br>ON<br>OFF |
| PHONE SETUP (CONTINUED) | ON<br>OFF<br>SELECT KEYPAD TONES<br>NORMAL TONES<br>SINGLE TONES<br>NO TONES<br>PHONE STATUS<br>STATUS REVIEW<br>MASTER RESET(EP5)<br>MASTER CLEAR(EP5) |

FIG.10B
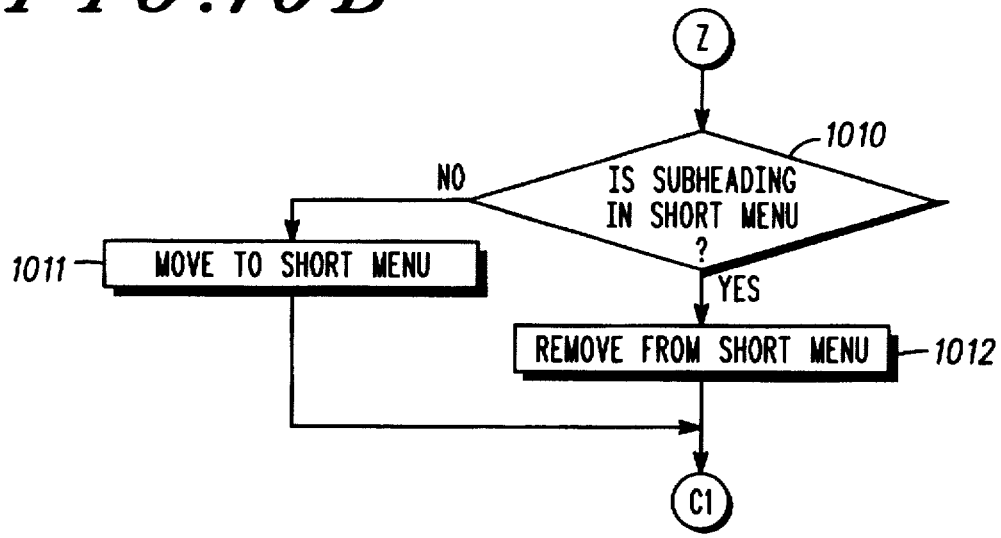
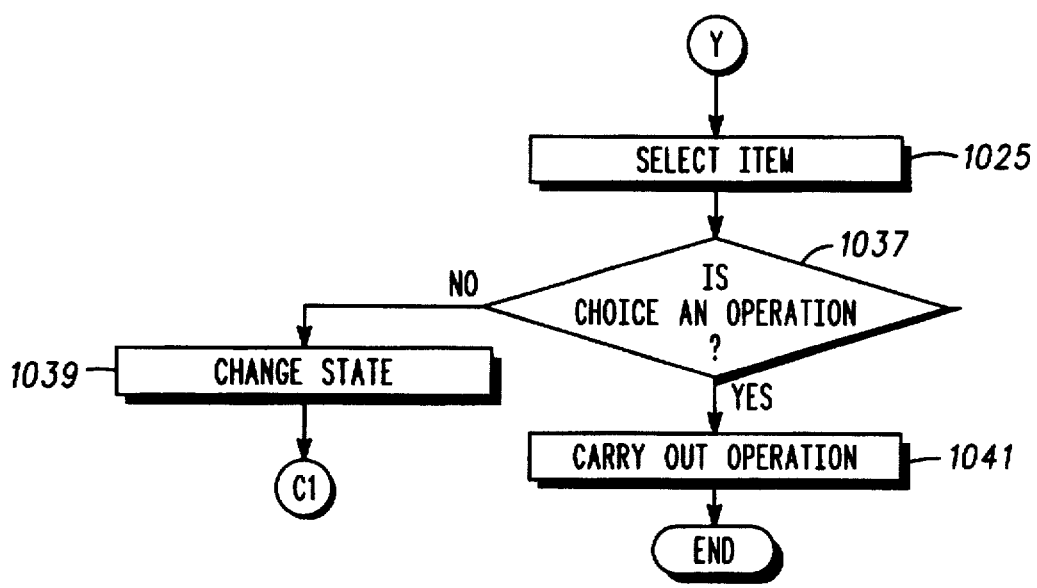

FIG.11B
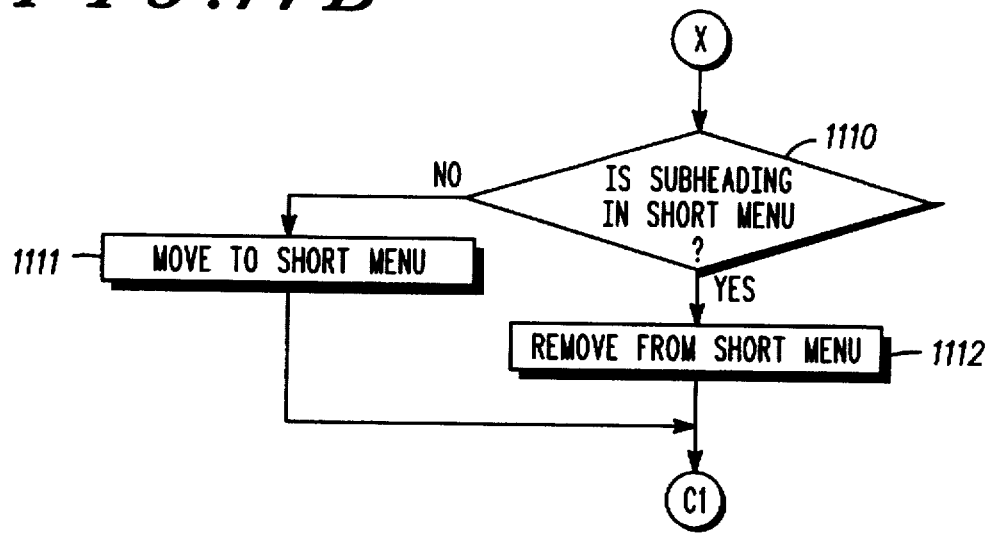
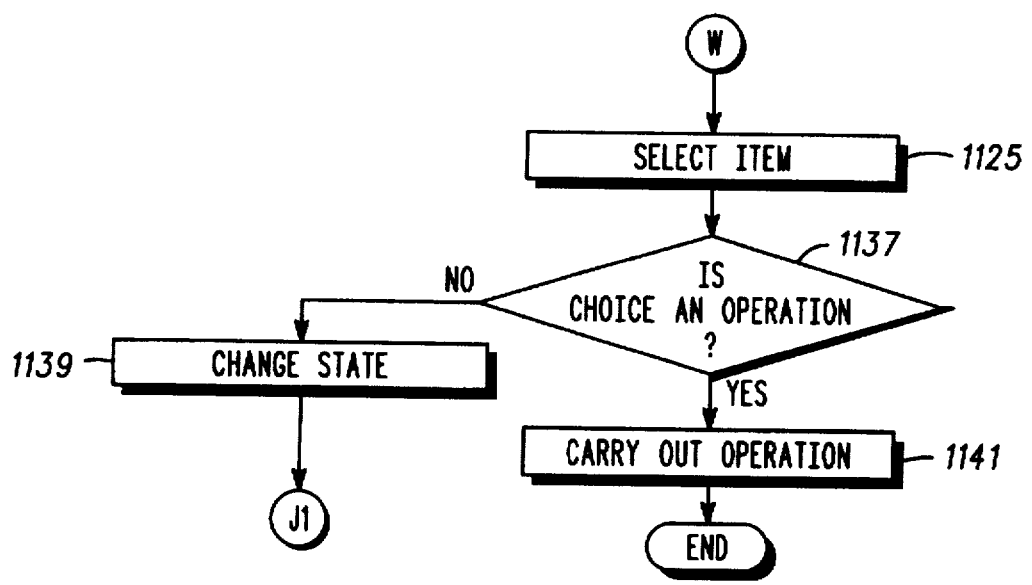

5,761,610

METHOD AND APPARATUS FOR DYNAMIC RADIO COMMUNICATION MENU

This is a continuation of application Ser. No. 08/308,899, filed Sep. 20, 1994, and now abandoned.

FIELD OF THE INVENTION

The present invention pertains to radio communication devices and more particularly to a menu system for such devices.

BACKGROUND OF THE INVENTION

As radio communication devices become more complex, including more features, it has become increasingly challenging to provide a user friendly interface. One man machine interface that has been developed is a menu system. Menu systems include a display and control keys. This display sequentially displays the features available to the user under the guidance of the control keys. An advantage of these menu systems is that they provide a way for the user to scroll through the features of the phone.

Although menu systems are easy for users to utilize, they have some disadvantages. If the system has one menu, the menu may be long and arduous to utilize, since the user must scroll through a lot of undesired features to find a particular feature that they are looking for. If the system includes a short menu and an extended menu, the user may find it difficult to switch from the short menu to the extended menu when the user does not find the feature that they are looking for in the short menu.

Accordingly, it is desirable to provide a menu system which is easier for the user to utilize.

BRIEF DESCRIPTION OF THE DRAWINGS

FIG. 2 is a circuit schematic in block diagram form illustrating a menu system circuit for the radiotelephone according to FIG. 1;

FIGS. 3A and 3B are a chart illustrating features in the menu for the radiotelephone according to FIG. 1;

FIG. 4 is a flow chart illustrating the operation of the controller reading a memory card;

FIG. 5, FIG. 6, FIG. 7, FIG. 8, FIG. 9, FIG. 10A, FIG. 10B, FIG. 11A, FIG. 11B and FIG. 12 are flow charts illustrating the operation of the menu system.

DETAILED DESCRIPTION OF THE DRAWINGS

Figure 1:
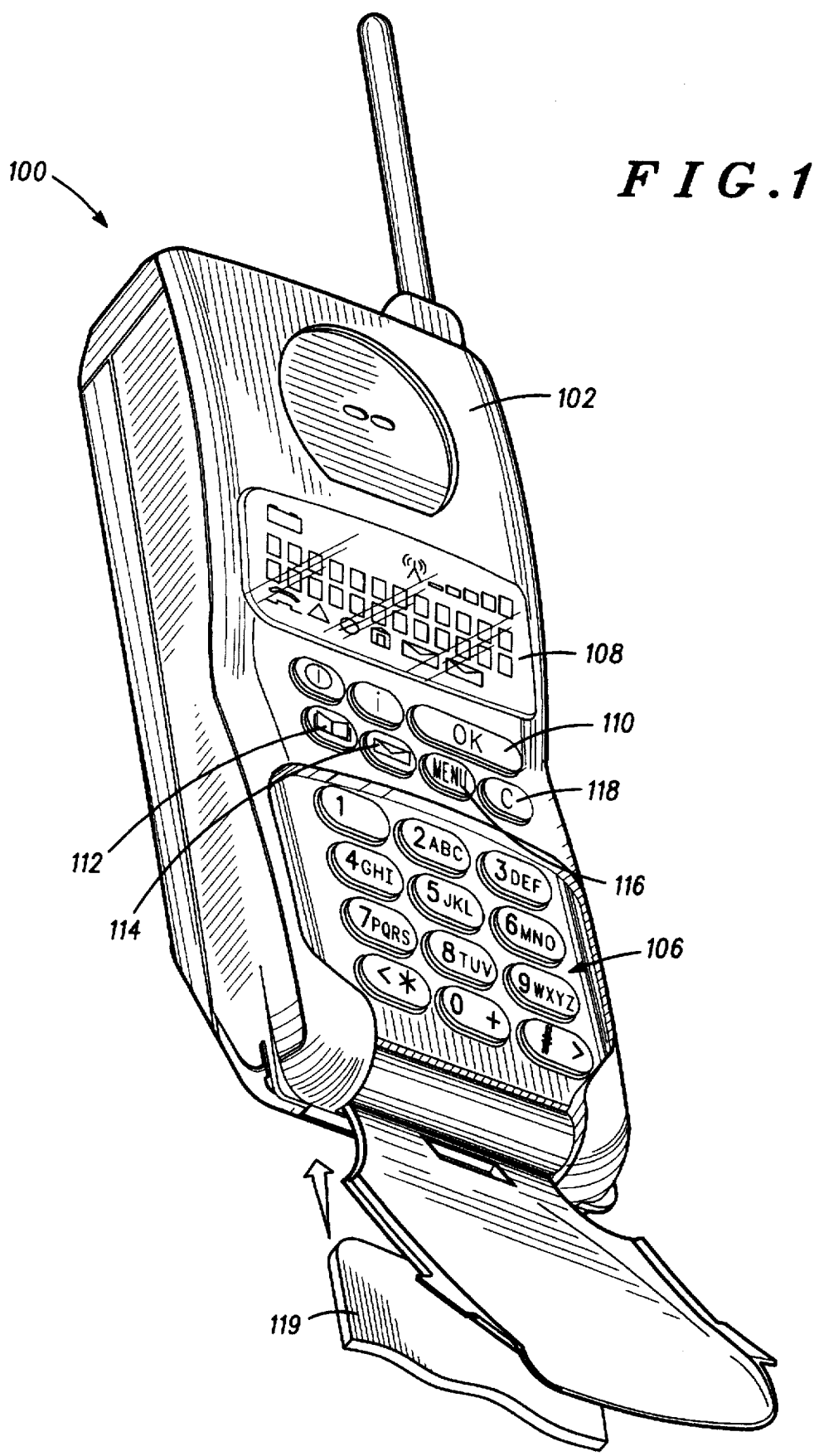
FIG. 1 is a front elevational view illustrating a radio telephone.

A radio communication device menu system includes memory storing menu items. A controller is coupled to the memory. A user controlled input is coupled to the controller for manually inputting control signals to the controller. A display is coupled to controller to display signals to the controller. The memory has a short menu and an extended menu, and the controller is responsive to a predetermined actuation pattern of the user controlled input to move items from the extended menu to the short menu.

Initially, it is noted that although the invention is illustrated in a radiotelephone 100, the menu system is applicable to other radio communication devices such as personal communicators, pagers, and the like. Additionally, as used herein, radio telephone refers to portable and cellular telephones. Those skilled in the art will also recognize that the invention may be advantageously employed in land-line telephones. Accordingly, as used herein, "device" refers to all of this equipment and their equivalents.

A radio telephone 100 (FIG. 1) includes a body 102 housing electronic circuit 104 (FIG. 2), a keypad, or keyset, 106 and a display 108. The keyset includes a selection, or "OK", key 110. The keypad also includes a phone book interrupt key 112, a message interrupt key 114, menu interrupt key 116 and a clear key 118. The radio telephone is designed to operate with a card 119, which may be a memory card or a SIM card.

The keyset 106 is connected to a controller 220 (FIG. 2) through a data bus 222. The controller may be implemented using a suitable commercially available microprocessor such as a Motorola MC 68332 microprocessor. The controller is connected to display 108 through a data bus 224. The controller is also coupled through a bi-directional data bus 230 to a memory 232. The memory 232 is a dynamic memory for storing short and long menu items. The menu is implemented using any suitable memory, such as a commercially available EEPROM. A card reader 221 (FIG. 2) is coupled to controller 220 via data bus 236. The card reader 221 for reading the card 119 is connected to the controller and may be implemented by any suitable card reader.

In operation, controller 220 (FIG. 2) is responsive to input signals from the keyset 106 to selectively control the menu information stored in memory 232 that is displayed on display 108. A catalog of the information, or items, that are sequentially displayed on the display 108 are illustrated in FIG. 3. Because the display is small, one item of is displayed at a time. The order of the items in the menu system is fixed, in that each item found in the catalogue cannot be completely removed from the catalog by the user. However, it is also envisioned that the user could have some control in the selection of the order of the menu features, and that some method may be provided to change the features of the menu system. For example, memory card 119 (FIG. 1) could be utilized to change the menu system.

A directory is shown in FIG. 3. The directory shows the following seven branches:

1. Call Related Features;
2. Phone Set-Up;
3. Messages;
4. Phone Book;
5. Network Selection;
6. Call Meters; and
7. Accessory Setup.

In the illustrated embodiment, message and phone book branches are only accessed using dedicated interrupt keys 114 and 112, respectively, on the keypad 106. These branches are not accessed through the menu key 116. The menu key is used to access the other branches. However, the accessory setup branch is only accessible if the radio telephone is connected in a car telephone cradle. This branch is thus invisible if the radio telephone is not connected in a car accessory. Accordingly, the scrolling menu at the highest level, scrolls between Call Related Features, Phone Set-Up, Network Selection, and Call Meters.

Within each branch, the menu has a plurality of items which are scrolled through by the user. The highest level items in each branch are Headings. For example, the Call Related Features include the following Headings: Last Ten Calls; Restrict My Phone Number; Call Diverting; Call Waiting; Call Barring; and Call Restrictions.

Within each heading, there will either be a sub-heading or a choice. Under the heading Last Ten Calls, the user can select the Last Ten Calls Made or the Last Ten Calls Received. These are choices. The Call Diverting Heading includes the following subheadings: Divert When Unavailable and Detail Diverting. The Call Diverting Heading also includes a Cancel All Diverting choice.

Under the subheadings, there may be sub-subheadings and choices. Thus, under the Divert Voice Calls subheading, there are the following sub-subheadings: Divert All Voice Calls If Busy, If No Answer, and If Not Reachable. Below these sub-subheadings, there are choices. Thus, the menu includes the following items: Branches, Headings, Subheadings, Sub-Subheadings, and Choices. Choices may be under Headings, Subheadings, or Sub-Subheadings. Additionally, it is envisioned that additional levels may be provided.

Each of the branches accessible through the menu key 116 includes a short menu and an extended menu. These menus are dynamic in that the user can selectively add items to the short menu and remove items from the short menu, as described in greater detail herein below. Detailed Diverting, Call Restrictions, Language Selection, Change Greeting, Battery Saving Mode, Select Keypad Tones, Phone Status, Network Search, Set Meter Format, Set Call Cost Rates, and Show Lifetime Meter headings, and the items therein, are only viewed in the full menu as shipped from the factory. The other items in FIG. 3 are thus default short menu items in the radiotelephones shipped from the factory. Additionally, it is envisioned that the order of the branches as shown in FIG. 3 does not change, such that the menu will always scroll through the items in the order illustrated. Those items which are only in the extended menu are skipped, such that they are not displayed in the short menu mode.

It is envisioned that the directory is dynamic to card 119 (FIG. 1). Thus, if card 119 does not permit the user to have certain options, such as Saving Preferred Networks, or if it requires a SIM card PIN, the unavailable options are automatically removed. This occurs when the SIM, or memory, card is inserted into the radio telephone. In operation, the controller 220 (FIG. 2) communicates with the SIM card through card reader 221. The controller determines what limitations are required by the SIM card, as indicated in blocks 400 (FIG. 4) and 401. If there are any limitations, the items, or choices, that the SIM card does not allow are removed from the menu, as indicated in block 402. This limits the number of items in the directory making it easier to use, and removes non-functional items that the user might otherwise get frustrated trying to use.

Figure 5:
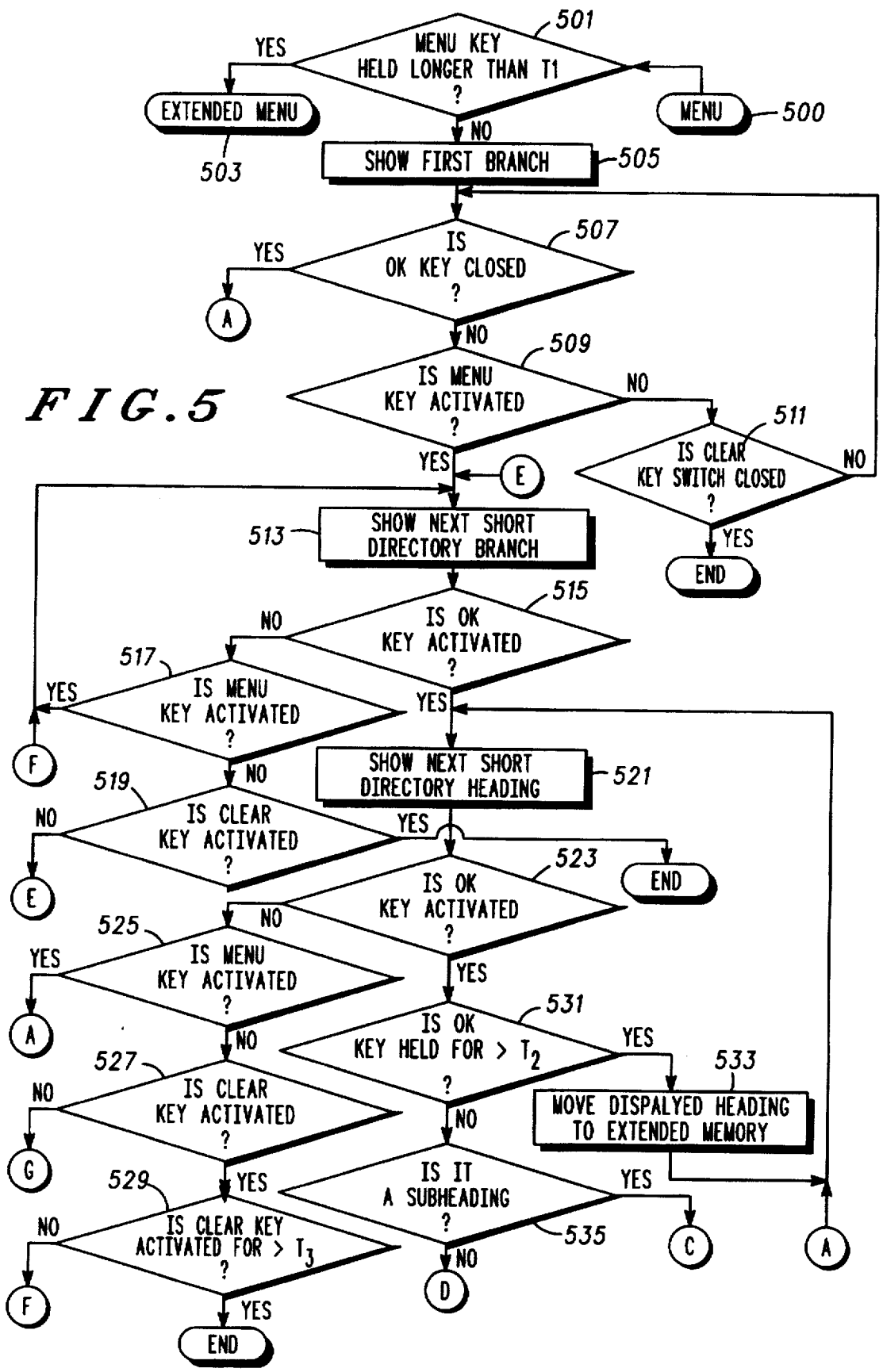

The operation of the menu system will now be described. When the menu key 116 is activated, the system enters the menu mode. In the menu mode, the controller 220 determines whether the menu key 116 was held for greater than a predetermined, or threshold, time period T1, as illustrated in decision block 501 (FIG. 5). For example, Time T1 can be two seconds. If the menu key is held for greater than time period T1, the controller 220 goes to the extended menu, described in FIGS. 8–11, as illustrated in block 503. If however, the menu key is held for shorter than time T1, the menu remains in the short menu operation, and the controller 220 will show the first branch ("Call Related Features") after time period T1 has elapsed, as illustrated in block 505. While the branch is displayed, the controller 220 will determine whether the OK key 110 is activated, as determined in decision block 507. If the OK, or selection, key 110 is activated, the controller proceeds to location A to show the next short menu heading as represented by block 521. If it is determined in decision block 507 that the OK key is not activated, the controller determines whether the menu key is activated in decision block 509. If the menu key is not activated, determined in block 509, the controller determines whether the clear key is activated in decision block 511. If the clear key is not determined to closed, or activated, the controller will return to decision block 507, such that the controller waits for the OK key to be activated, the menu key to be activated, or the clear key to be activated. If it is determined in decision block 511 that the clear key was activated, the controller exits the menu mode. If however, the menu key was activated, as determined in decision block 509, the controller will show the next short menu branch, as indicated in block 513.

With the menu branch displayed, the controller 220 determines whether the selection key has been activated as shown in decision block 515. If the OK key has not been activated, the controller 550 determines whether the menu key 110 is activated, as indicated in decision block 517. If the menu key is activated, the controller will show the next menu branch as indicated in block 513. If the menu key is not determined to be activated in block 517, the controller 220 determines whether the clear key 118 has been activated, as indicated in block 519. If the clear key has not been activated, the controller 220 returns to point E, block 515, and waits for the OK key 110, the menu key 116, or the clear key 118 to be activated. If the controller determines in block 519 that the clear key was activated, the controller exits the menu.

If it was determined in decision block 515 that the OK key 110 was activated, the controller 220 exits the menu branch level and enters the short menu heading level. The controller enters the branch that was displayed on display 108 at the time that the OK key was activated, as indicated in block 521. With a short menu heading displayed, the controller determines if the OK key 110 is activated in decision block 523. If the OK key is not activated, the controller determines whether the menu key 116 is activated in decision block 525. If the menu key is activated, the controller 220 scrolls to the next short menu heading, skipping any extended menu items. If it is determined in decision block 525 that the menu key 116 is not activated, the controller 220 determines whether the clear key 118 is activated in decision block 527. If the clear key is not activated, the controller 220 returns to point G, to wait for actuation of the OK key (decision block 523), the menu key or the clear key. The controller 220 thus waits for the OK key, the menu key, or the clear key to be activated before taking a further action.

If it is determined at decision block 527 that the clear key is activated, the controller 220 determines whether the clear key was held for greater than predetermined, or threshold, time period T3. If the clear key is held for longer than time T3, the controller 220 exits the menu program. Holding the clear key for greater than period T3 thus provides a means of quickly exiting the menu program. If however, the clear key was activated for less than time period T3, the controller 220 will move up one level to point F, showing the next menu branch. This allows the clear key to be used to step up one level (for example from the short menu headings to the short menu branch). T3 is selected to be approximately 3 seconds.

If it is determined in decision block 523 that the OK key was activated, the controller 220 determines whether the OK key was held for a time period greater than a predetermined, or threshold, time period T2, as indicated in decision block 531. If the OK key was held for a time period greater than T2, the controller 220 removes the displayed heading from the short menu, such that the item may only be viewed from the extended menu as indicated in decision block 533. This allows items to be easily moved from the short menu to the extended menu using the OK key. The program will then show the next short menu heading. If the OK was not held for a time period greater than T2, as determined in decision block 531, the controller 220 determines whether the next level is a subheading or a choice. If the next level is a subheading, the controller 220 goes to C. If, on the other hand, the next menu level is a choice, the controller 220 goes to D.

Figure 6:
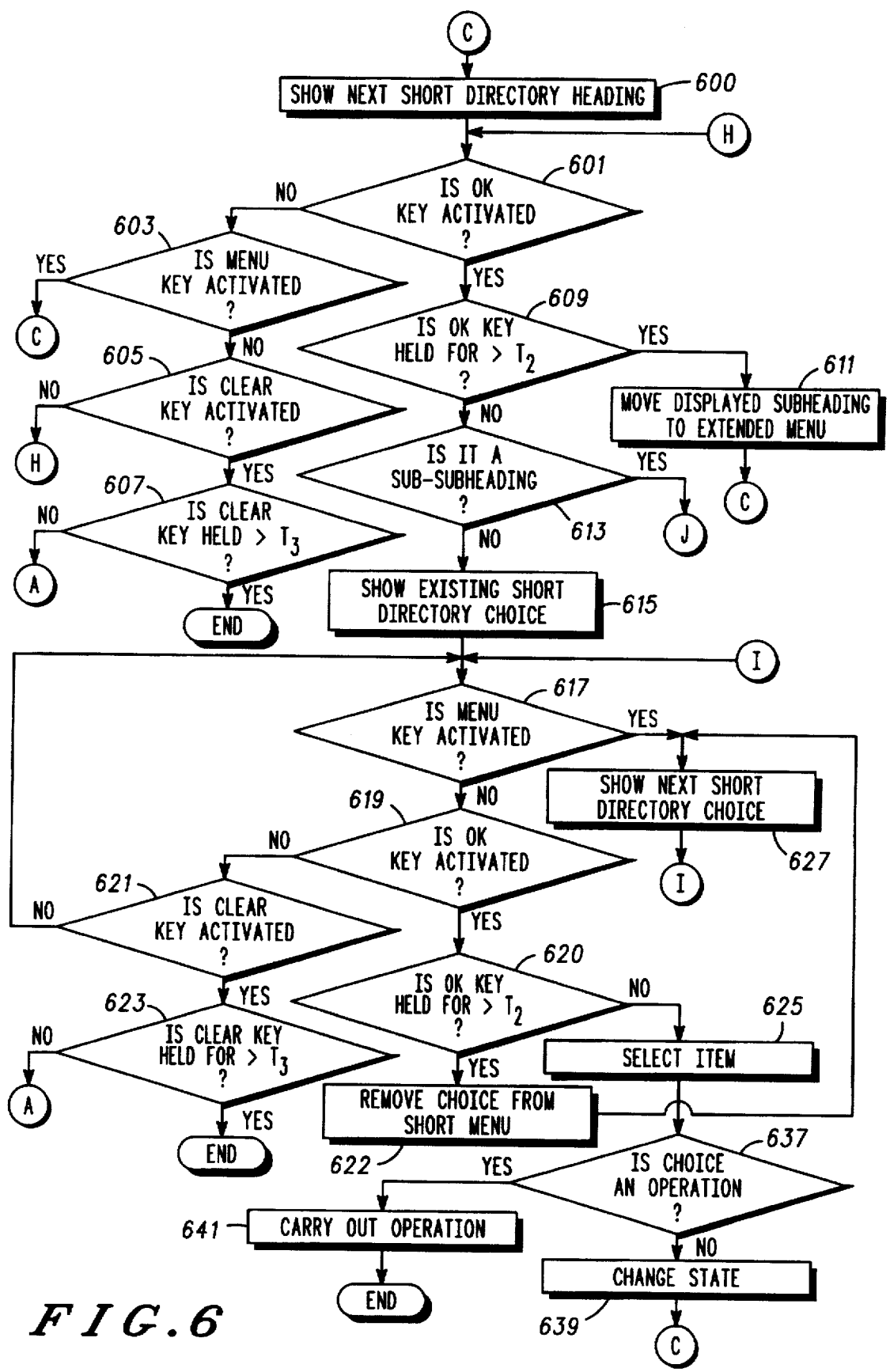

If the next level is a subheading (point C in FIG. 6), the controller 220 displays the next short menu subheading on display 108, as indicated in block 600 (FIG. 6). While the subheading is displayed, the controller determines whether the OK key is actuated in decision block 601. If the OK key is not activated, the controller determines whether the menu key 116 is activated in decision block 603. If the menu key is activated, the controller 220 shows the next short menu subheading as indicated in block 600. The menu key is thus used to scroll through the subheadings. If the menu is not activated, the controller 220 determines whether the clear key is activated, as indicated in decision block 605. If the clear key is not activated, the controller 220 returns to H and waits for the OK key, the menu key, or the clear key to be activated. If the clear key is activated, as determined in decision block 605, the controller 220 determines whether the clear key is held for greater than time period T3 in decision block 607. If the controller 220 determines in decision block 607 that the clear key is held for a time period greater than T3, the controller 220 goes to B, ending the menu key routine, or mode. If, however, the clear key is held for less than time period T3, the controller 220 moves up one level to the branch level, and thus returns to A and shows the next short menu branch. This allows the user to exit the subheading level and move to a higher level using the clear key.

If the controller 220 determines in decision block 601 that the OK key was activated, the controller determines whether the OK is held for greater than time period T2 in decision block 609. If the OK key is held for greater than time period T2, the controller 220 moves the subheading displayed to the extended menu, as indicated in block 611. The controller 220 then shows the next menu subheading at block 600. If it is determined in decision block 609 that the OK key was held for less than time period T2, the controller 220 determines whether the next lower level in the heading displayed while the OK was activated is a subheading or a choice, as indicated in decision block 613.

If the next level is a choice, the controller 220 controls display 108 to show the existing menu choice as indicated in block 615. The controller then waits for the menu key 116 to be activated in decision block 617, the OK key to be activated in block 619, or the clear key to be activated in decision block 621. If the OK key, the menu key, and the clear key are not activated, the controller 220 will continue to show the existing menu choice.

If the clear key is activated first, as determined in decision block 621, the controller 220 determines whether the clear key is held for a time period greater than T3, in decision block 623. If the clear key is held for a time period greater than T3, the controller 220 exits the menu routine. If, however, the clear key is held for a time period less than T3, the controller 220 returns to the next higher level at A (FIG. 5), and displays the next branch heading. This allows the user to return to a higher level.

If the OK key is the first key activated, as determined in decision block 619, the controller 220 determines whether the OK key was held for greater than period T2, as indicated in decision block 620. If it was held for greater than period T2, the controller removes the choice displayed on display 108 from short menu, such that it is no longer viewed in the short menu, as indicated in block 622. If the OK key is held for less than, or equal to, time period T2, the controller selects the choice displayed on display 108, as indicated in block 625. Following the selection of a choice in block 625, the controller 220 will determine whether the choice requires a change of state or if the controller is to carry out a particular operation, or function. If the choice is a choice, the controller 220 changes the state, as indicated in block 639, and returns to show the next subheading. If the choice is an operation, the controller 220 carries out the operation as indicated in block 641, and then ends the menu routine.

If the menu key was determined to be activated in decision block 617, the controller 220 scrolls to the next short menu choice, as indicated in block 627. Controller 220 then waits for actuation of the next key in decision blocks 617, 619, and 621.

Figure 7:
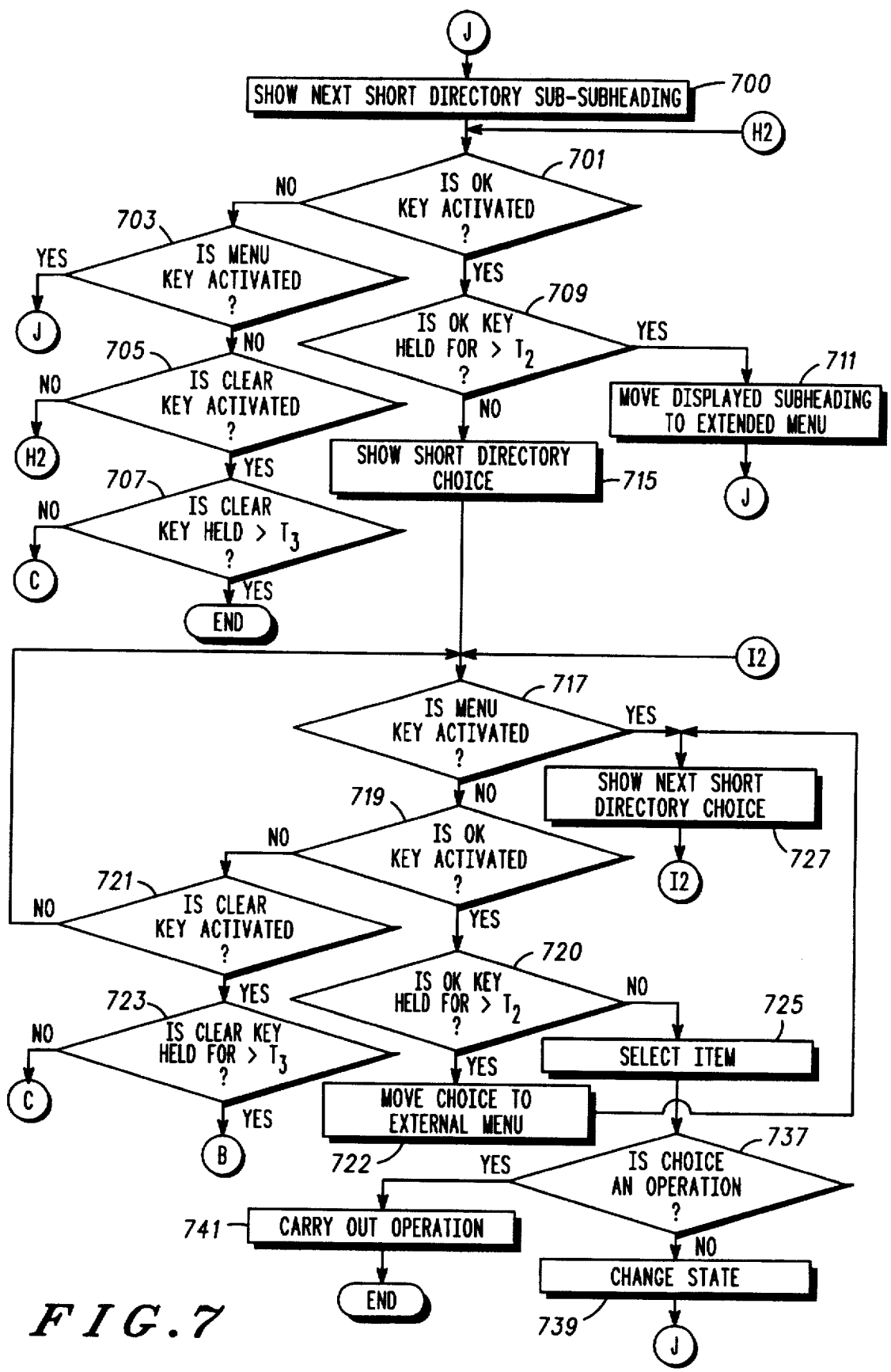
Figure 8:
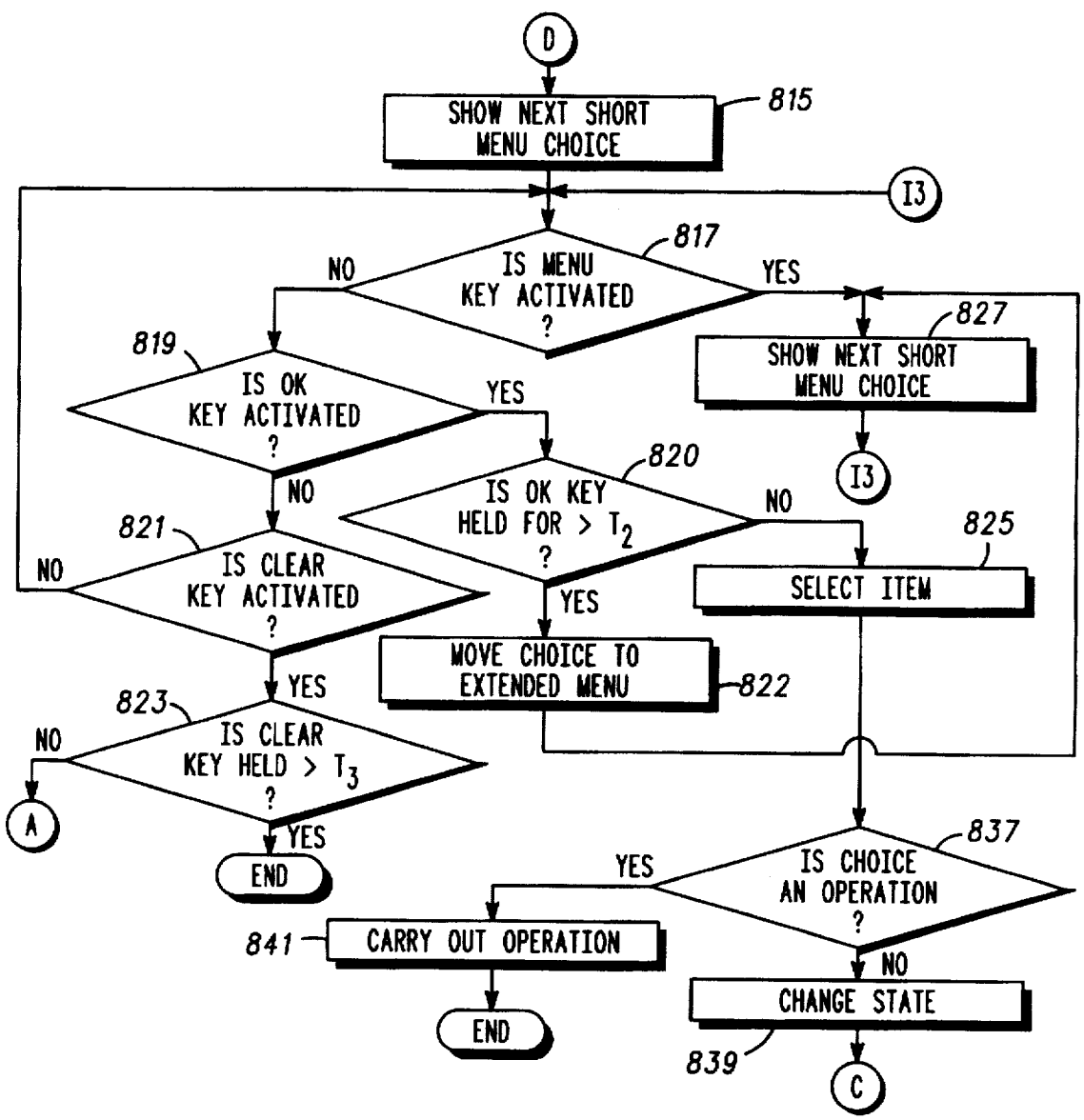
Figure 9:
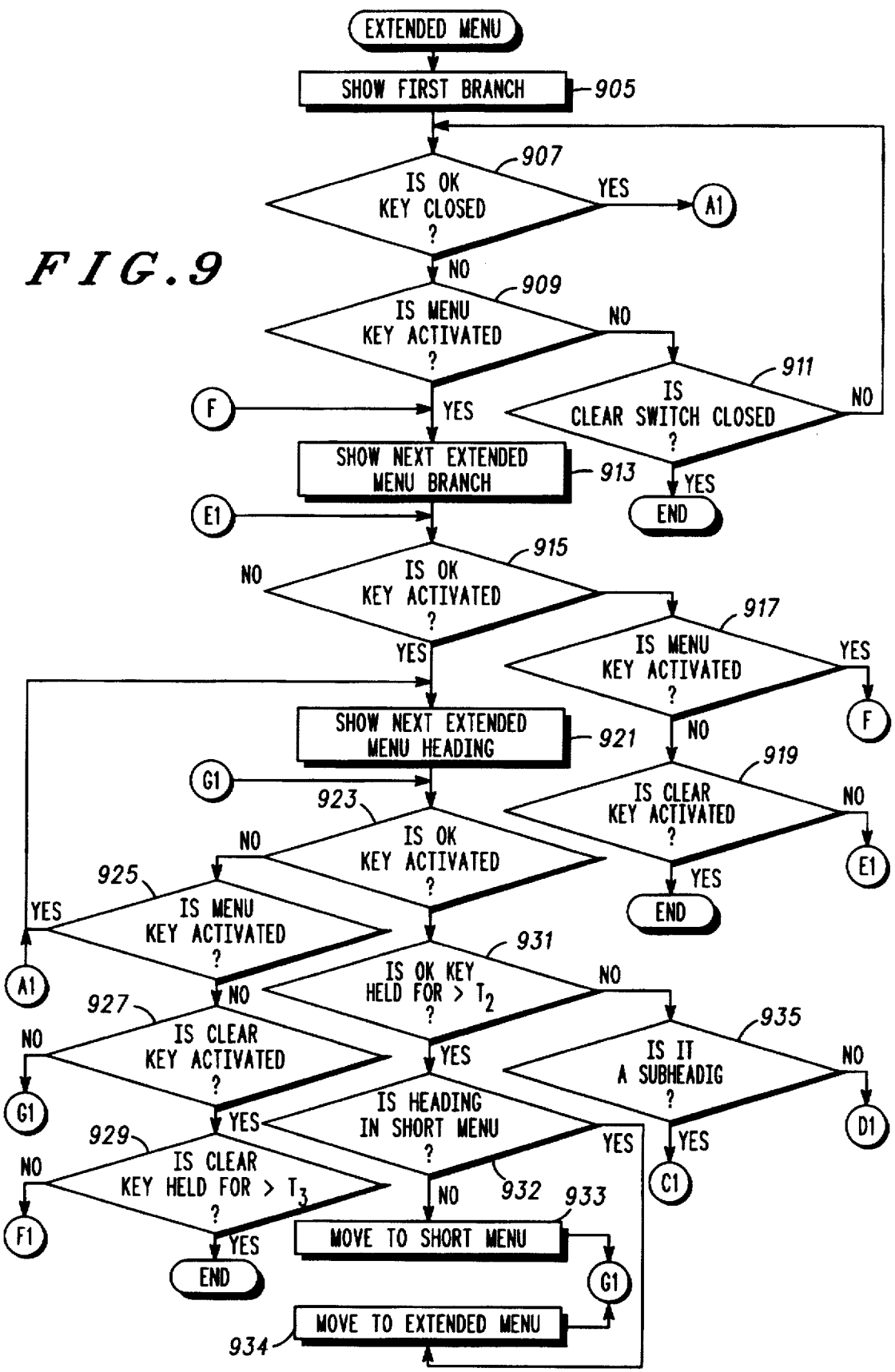

If the next level is a sub subheading (point J in FIG. 7), the controller 220 displays the next short menu sub-subheading on display 108, as indicated in block 700 (FIG. 7). While the sub-subheading is displayed, the controller determines whether the OK key is activated in decision block 701. If the OK key is not activated, the controller determines whether the menu key 116 is activated in decision block 703. If the menu key is activated, the controller 220 shows the next short menu sub-subheading as indicated in block 700. The menu key is thus used to scroll through the sub-subheadings.

If, the menu key 116 is not activated, as determined in block 703, the controller 220 determines whether the clear key is activated, as indicated in decision block 705. If the clear key is not activated, the controller 220 returns to H2 and waits for the OK key, the menu key, or the clear key to be activated. If the clear key is activated, as determined in decision block 705, the controller 220 determines whether the clear key is held for greater than time period T3 in decision block 707. If the controller 220 determines in decision block 707 that the clear key is held for a time period greater than T3, the controller 220 goes to B, ending the menu key routine, or mode. If, however, the clear key is held for less than time period T3, the controller 220 moves up one level to A and shows the next short menu heading. This allows the user to exit the subheading level and move to a higher level using the clear key.

If the controller 220 determines in decision block 701 that the OK key was activated, the controller determines whether the OK is held for greater than time period T2 in decision block 709. If the OK key is held for greater than time period T2, the controller 220 moves the sub-subheading displayed to the extended menu, as indicated in block 711. The controller 220 then shows the next menu sub-subheading at block 700. If it is determined in decision block 709 that the OK key was held for less than time period T2, the controller 220 determines whether the next lower level in the heading displayed while the OK was activated is a sub-subheading or a choice, as indicated in decision block 713.

If the next level is a choice, the controller 220 controls display 108 to show the existing menu choice as indicated in block 715. The controller then waits for the menu key 116 to be activated in decision block 717, the OK key to be activated in block 719, or the clear key to be activated in decision block 721. If the OK key, the menu key, and the clear key are not activated, the controller 220 will continue to show the existing menu choice.

If the clear key is activated first as determined in decision block 721, the controller 220 determines whether the clear key is held for a time period greater than T3 in decision block 723. If the clear key is held for a time period greater than T3, the controller 220 exits the menu routine. If, however, the clear key is held for a time period less than T3, the controller 220 returns to the next higher level at C (FIG. 6), and displays the next sub-subheading. This allows the user to return to a higher level.

If the OK key is the first key activated, as determined in decision block 719, the controller 220 determines whether the OK key was held for greater than period T2 in decision block 720. If it was held for greater than period T2, the controller moves the choice displayed on display 108 to the extended menu, such that it is no longer in the short menu, as indicated in block 722. If the key is held for less than, or equal to, time period T2, the controller selects the choice displayed on display 108, as indicated in block 725. Following the selection of a choice in block 725, the controller 220 will determine whether the choice requires a change of state or if the controller is to carry out a particular operation, or function. If the choice is a change of state, the controller 220 changes the state, as indicated in block 739, and returns to show the next sub-subheading. If the choice is an operation, the controller 220 carries out the operation as indicated in block 741, and then ends the menu routine.

If the menu key was determined to be activated in decision block 717, the controller 220 scrolls to the next short menu choice, as indicated in block 727. Controller 220 then waits for actuation of the next key in decision blocks 717, 719, and 721.

If it is determined in decision block 535 that the next level is a choice, the controller 220 controls display 108 to show the existing menu choice at point D (FIG. 8), as indicated in block 815. The controller then waits for the menu key 116 to be activated in decision block 817, the OK key to be activated in block 819, or the clear key to be activated in decision block 821. If the OK key, the menu key, and the clear key are not activated, the controller 220 will continue to show the existing menu choice.

If the clear key is activated first as determined in decision block 821, the controller 220 determines whether the clear key is held for a time period greater than T3 in decision block 823. If the clear key is held for a time period greater than T3, the controller 220 exits the menu routine. If, however, the clear key is held for a time period less than T3, the controller 220 returns to the next higher level at A (FIG. 5), and displays the next heading. This allows the user to return to a higher level.

If the OK key is the first key activated, as determined in decision block 819, the controller 220 determines whether the OK key was held for greater than period T2, as indicated in decision block 820. If it was held for greater than period T2, the controller moves the choice displayed on display 108 to the extended menu, such that it is no longer in the short menu, as indicated in block 822. If the key is held for less than, or equal to, time period T2, as determined at decision block 820, the controller selects the choice displayed on display 108, as indicated in block 825. Following the selection of a choice in block 825, the controller 220 will determine whether the choice requires a change of state or if the controller is to carry out a particular operation, or function. If the choice is an operation, which requires a change of state, the controller 220 changes the state, as indicated in block 839, and returns to show the next subheading. If the choice is an operation, the controller 220 carries out the operation as indicated in block 841, and then ends the menu routine.

If the menu key was determined to be activated in decision block 817, the controller 220 scrolls to the next short menu choice, as indicated in block 827. Controller 220 then waits for actuation of the next key in decision blocks 817, 819, and 821.

If it is determined that the menu key is held for greater than time period T1, in decision block 501, the controller 220 goes to the extended menu, illustrated in FIGS. 9–12. The controller 220 shows the first branch ("Call Related Features") after time period T1 has elapsed, as illustrated in block 905. While the branch is display, the controller 220 will determine whether the OK key 110 is activated, as determined in decision block 907. If the OK, or selection, key 110 is activated, the controller proceeds to location A to show the next extended menu heading as represented by block 921. If it is determined in block 907 that the OK key is not activated, the controller determines whether the menu key is activated in decision block 909. If the menu key is not determined to be activated in block 909, the controller determines whether the clear key is activated in decision block 911. If the clear key is not determined to closed, or activated, the controller will return to decision block 907, such that the controller waits for the OK key to be activated, the menu key to be activated, or the clear key to be activated. If it is determined in decision block 911 that the clear key was activated, the controller exits the menu mode. If however, the menu key was activated, as determined in decision block 909, the controller will show the next extended menu branch, as indicated in block 913

With the menu branch displayed, the controller 220 determines whether the selection key has been activated as shown in decision block 915. If the OK key has not been activated, the controller 950 determines whether the menu key 110 is activated, as indicated in decision block 917. If the menu key is activated, the controller will show the next menu branch as indicated in block 913. If the menu key is not determined to be activated in block 917, the controller 220 determines whether the clear key 118 has been activated, as indicated in block 919. If the clear key has not been activated, the controller 220 returns to point E, block 915, and waits for the OK key 110, the menu key 116, or the clear key 118 to be activated. If the controller determines in block 919 that the clear key was activated, the controller exits the menu.

If it was determined in decision block 915 that the OK key 110 was activated, the controller 220 exits the menu branch level and enters the extended menu heading level. The controller enters the branch that was displayed on display 108 at the time that the OK key was activated, as referenced by block 921. With the extended menu heading displayed, the controller determines if the OK key 110 is activated in decision block 923. If the OK key is not activated, the controller determines whether the menu key 116 is activated in decision block 925. If the menu key is activated, the controller 220 scrolls to the next extended menu heading, skipping any extended menu items. If it is determined in decision block 925 that the menu key 116 is not activated, the controller 220 determines whether the clear key 118 is activated in decision block 927. If the clear key is not activated, the controller 220 returns to point G, to wait for actuation of the OK key (decision block 923), the menu key or the clear key. The controller 220 thus waits for the OK key, the menu key, or the clear key to be activated before taking a further action.

If it is determined at decision block 927 that the clear key is activated, the controller 220 determines whether the clear key was held for greater than predetermined, or threshold, time period T3. If the clear key is held for longer than time T3, the controller 220 exits the menu program. Holding the clear key for greater than period T3 thus, provides a means of quickly exiting the menu program. If however, the clear key was activated for less than time period T3, the controller 220 will move up one level to point F, showing the next menu branch. This allows the clear key to be used to step up one level from the extended menu headings to menu branch. T3 is selected to be approximately 3 seconds.

If it is determined in decision block 923 that the OK key was activated, the controller 220 determines whether the OK key was held for a time period greater than a predetermined, or threshold time period T, as indicated in decision block 925. If the OK key was held for a time period greater than T2, the controller 220 determines whether the item displayed in display 108 when the OK key is activated is in the short menu, as indicate in block 932. If it is not, the controller moves the displayed heading to the short menu as indicated in decision block 933. This allows items to be easily moved from the extended menu to the short menu using the OK key. If the item was in the short menu, the controller removes the item from the short menu, although it remains in the extended menu, as indicated in block 934. This allows items to be removed from the short menu in the extended menu mode. In either case, the controller will control the display 108 to show the extended menu heading until another key is activated.

If the OK was not held for a time period greater than T2, as determined in decision block 931, the controller 220 determines whether the next level is a subheading or a choice. If the next level is a subheading, the controller 220 goes to C. If, on the other hand, the next menu level is a choice, the controller 220 goes to D.

Figure 10A:
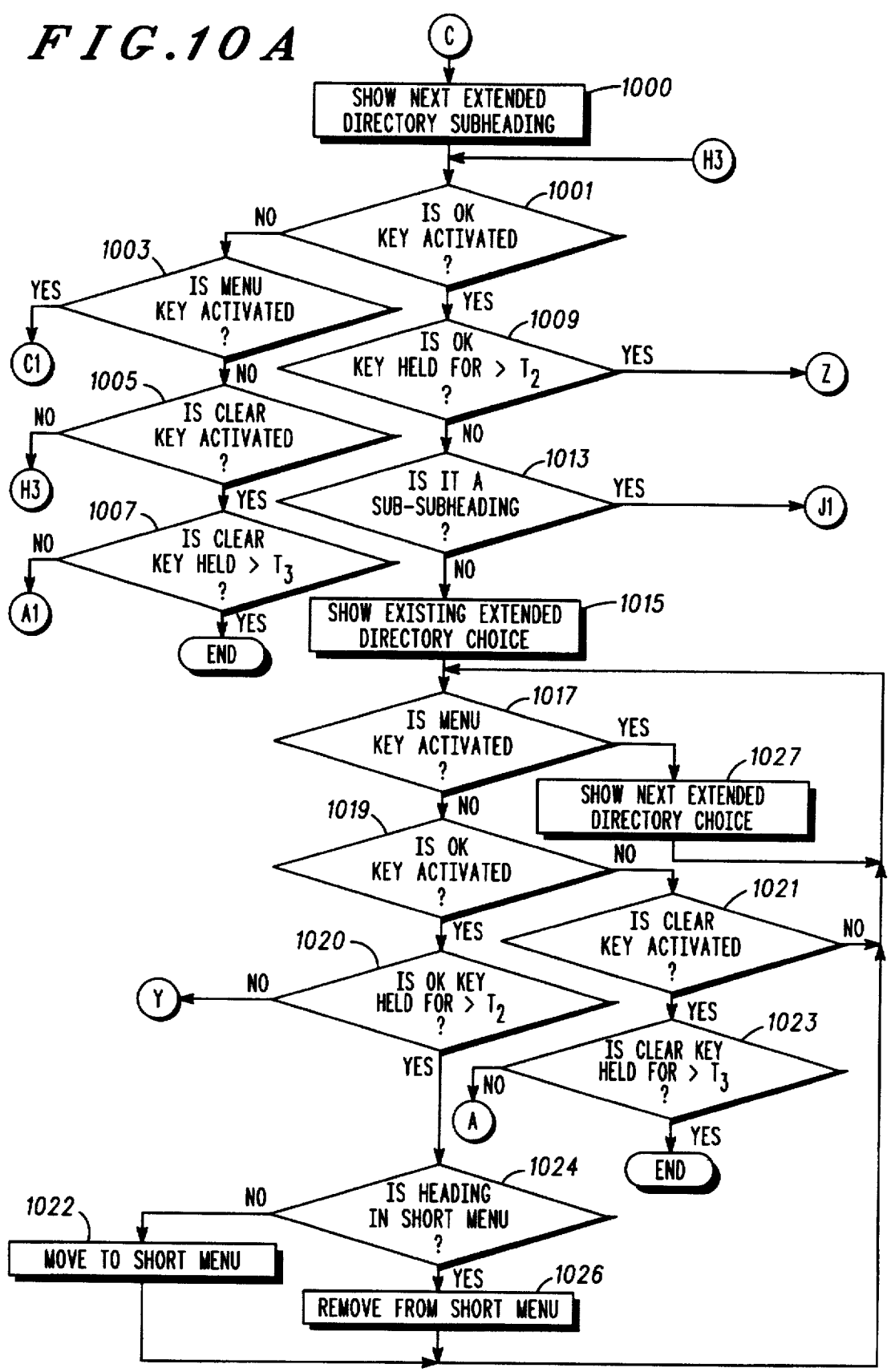

If the next level is a subheading (point C in FIG. 10), the controller 220 displays the next extended menu subheading on display 108, as indicated in block 1000 (FIG. 10). While the subheading is displayed, the controller determines whether the OK key is activated in decision block 1001. If the OK key is not activated, the controller determines whether the menu key 1106 is activated in decision block 1003. If the menu key is activated, the controller 220 shows the next extended menu subheading as indicated in block 1000. The menu key is thus used to scroll through the subheadings. If the menu key is not activated, the controller 220 determines whether the clear key is activated, as indicated in decision block 1005. If the clear key is not activated, the controller 220 returns to H and waits for the OK key, the menu key, or the clear key to be activated. If the clear key is activated, as determined in decision block 1005, the controller 220 determines whether the clear key is held for greater than time period T3 in decision block 1007. If the controller 220 determines in decision block 1007 that the clear key is held for a time period greater than T3, the controller 220 goes to B, ending the menu key routine, or mode. If, however, the clear key is held for less than time period T3, the controller 220 moves up one level to A and shows the next extended menu heading. This allows the user to exit the subheading level and move to a higher level using the clear key.

If the controller 220 determines in decision block 1001 that the OK key was activated, the controller determines whether the OK is held for greater than time period T2 in decision block 1009. If the OK key was held for a time period greater than T2, the controller 220 determines whether the item displayed in display 108 when the OK key is activated is in the short menu, as indicate in block 1010. If it is not, the controller moves the displayed heading to the short menu as indicated in block 1011. This allows items to be easily moved from the extended menu to the short menu using the OK key. If the item was in the short menu, the controller removes the item from the short menu, as indicated in block 1012. This allows items to be moved from the short menu in the extended menu mode. In either case, the controller 220 then shows the next menu subheading at block 1000.

If it is determined in decision block 1009 that the OK key was held for less than time period T2, the controller 220 determines whether the next lower level in the heading displayed while the OK was activated is a subheading or a choice, as indicated in decision block 1013.

If the next level is a choice, the controller 220 controls display 108 to show the existing menu choice as indicated in block 1015. The controller then waits for the menu key 116 to be activated in decision block 1017, the OK key to be activated in block 1019, or the clear key to be activated in decision block 1021. If the OK key, the menu key, and the clear key are not activated, the controller 220 will continue to show the existing menu choice.

If the clear key is activated first as determined in decision block 1021, the controller 220 determines whether the clear key is held for a time period greater than T3 in decision block 1023. If the clear key is held for a time period greater than T3, the controller 220 exits the menu routine. If, however, the clear key is held for a time period less than T3, the controller 220 returns to the next higher level at A (FIG. 5), and displays the next heading. This allows the user to return to a higher level.

If the OK key is the first key activated, as determined in decision block 1019, the controller 220 determines whether the OK key was held for greater than period T2 in decision block 1020. If the OK key was held for a time period greater than T2, the controller 220 determines whether the item displayed in display 108 when the OK key is activated is in the short menu, as indicate in block 1024. If it is not, the controller moves the displayed heading to the short menu as indicated in block 1022. This allows items to be easily moved from the extended menu to the short menu using the OK key. If the item was in the short menu, the controller removes the item from the short menu as indicated in block 1026. This allows items to be moved from the short menu in the extended menu mode. In either case, the controller 220 then waits for the clear key 118, the menu key 116 or the OK key 110 to be activated.

If the OK key 116 is held for less than, or equal to, time period T2, as determined at decision block 1020, the controller selects the choice displayed on display 108, as indicated in block 1025. Following the selection of a choice in block 1025, the controller 220 will determine whether the choice requires a change of state or if the controller is to carry out a particular operation, or function, as indicated in decision block 1037. If the choice is a change of state, the controller 220 changes the state, as indicated in block 1039, and returns to show the next subheading. If the choice is an operation, the controller 220 carries out the operation as indicated in block 1041, and then ends the menu routine.

If the menu key was determined to be activated in decision block 1017, the controller 220 scrolls to the next extended menu choice, as indicated in block 1027. Controller 220 then waits for actuation of the next key in decision blocks 1017, 1019, and 1021.

Figure 11A:
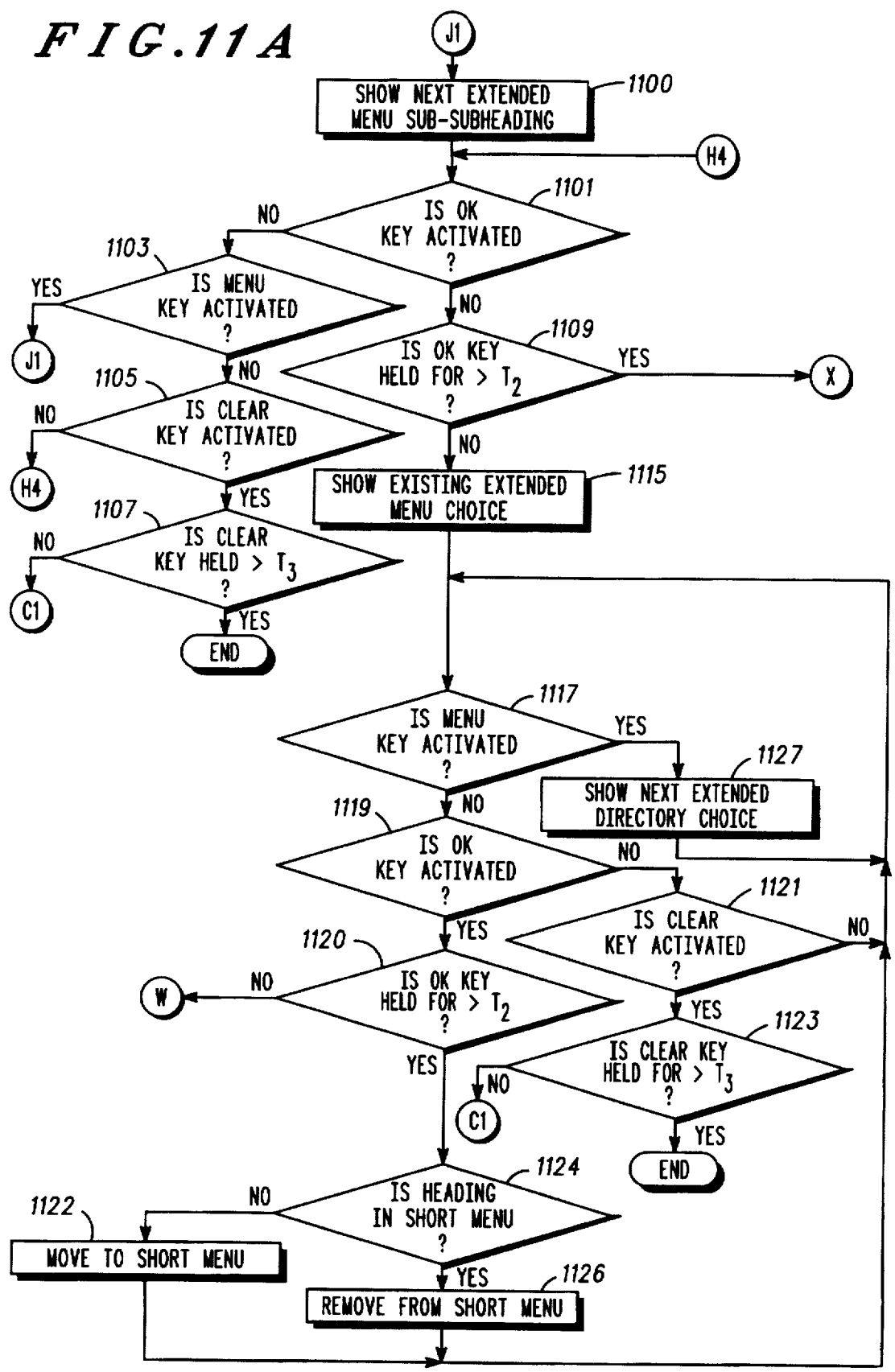
Figure 12:
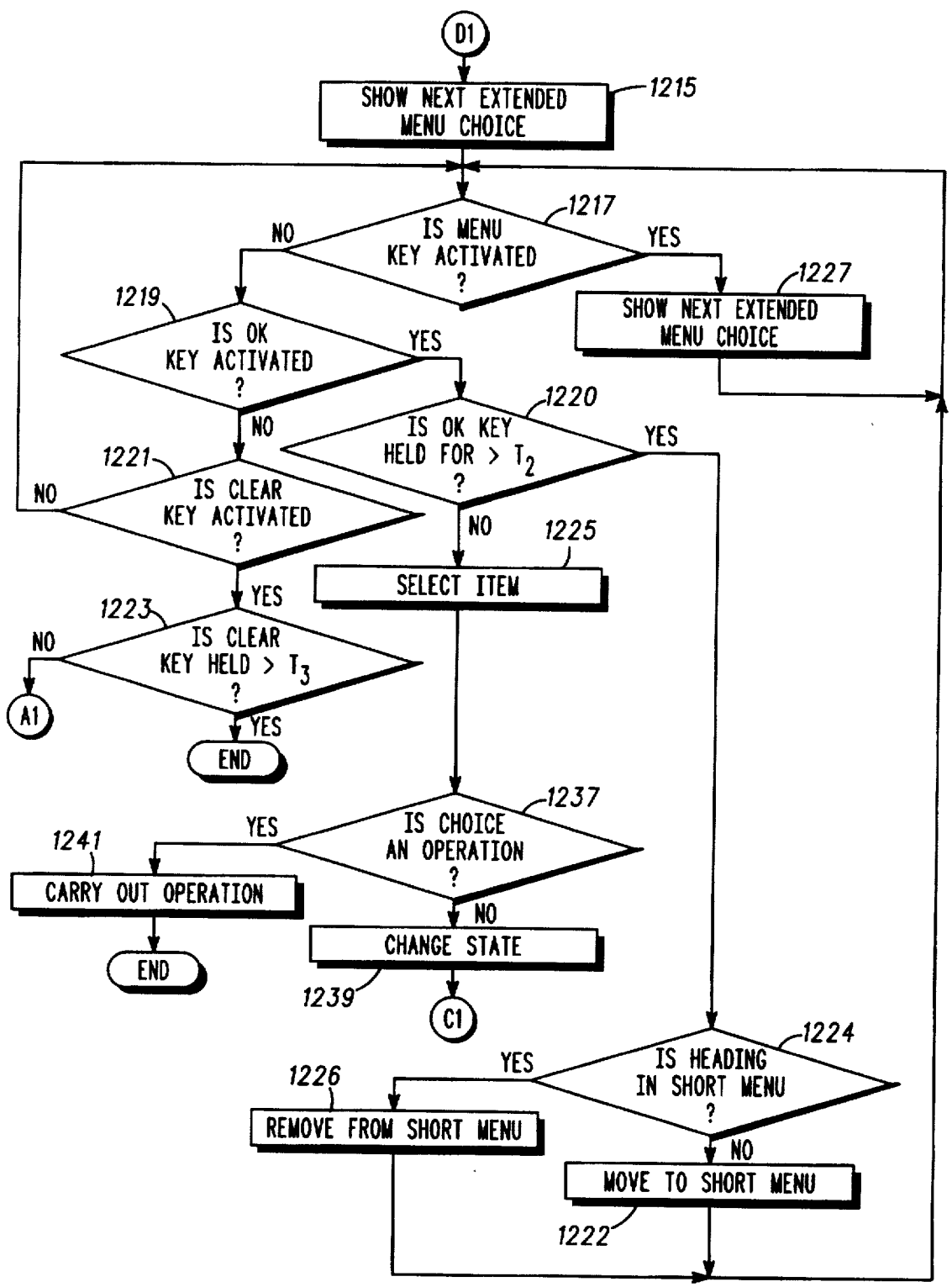

If the next level is a sub subheading (point J in FIG. 11), the controller 220 displays the next extended menu sub-subheading on display 108, as indicated in block 1100 (FIG. 11). While the sub-subheading is displayed, the controller determines whether the OK key is activated in decision block 1101. If the OK key is not activated, the controller determines whether the menu key 116 is activated in decision block 1103. If the menu key is activated, the controller 220 shows the next extended menu sub-subheading as indicated in block 1100. The menu key is thus used to scroll through the sub-subheadings.

If, the menu key 116 is not activated, the controller 220 determines whether the clear key is activated, as indicated in decision block 1105. If the clear key is not activated, the controller 220 returns to H2 and waits for the OK key, the menu key, or the clear key to be activated. If the clear key is activated, as determined in decision block 1105, the controller 220 determines whether the clear key is held for greater than time period T3 in decision block 1107. If the controller 220 determines in decision block 1107 that the clear key is held for a time period greater than T3, the controller 220 goes to B, ending the menu key routine, or mode. If, however, the clear key is held for less than time period T3, the controller 220 moves up one level to C and shows the next extended menu heading. This allows the user to exit the subheading level and move to a higher level using the clear key.

If the controller 220 determines in decision block 1101 that the OK key was activated, the controller determines whether the OK is held for greater than time period T2 in decision block 1109. If the OK key is held for greater than time period T2, the controller 220 in decision block 1109. If the OK key was held for a time period greater than T2, the controller 220 determines whether the item displayed in display 108 when the OK key is activated is in the short menu, as indicate in block 1110. If it is not, the controller moves the displayed heading to the short menu as indicated in block 1111. This allows items to be easily moved from the extended menu to the short menu using the OK key. If the item was in the short menu, the controller removes the item from the short menu as indicated in block 1112. This allows items to be moved from the short menu in the extended menu mode. In either case, the controller 220 then shows the next menu sub-subheading at block 1100.

If it is determined in decision block 1109 that the OK key was held for less than time period T2, the controller 220 determines whether the next lower level in the heading displayed while the OK was activated is a sub-subheading or a choice, as indicated in decision block 1113.

If the next level is a choice, the controller 220 controls display 108 to show the existing menu choice as indicated in block 1115. The controller then waits for the menu key 116 to be activated in decision block 1117, the OK key to be activated in block 1119, or the clear key to be activated in decision block 1121. If the OK key, the menu key, and the clear key are not activated, the controller 220 will continue to show the existing menu choice.

If the clear key is activated first as determined in decision block 1121, the controller 220 determines whether the clear key is held for a time period greater than T3 in decision block 1123. If the clear key is held for a time period greater than T3, the controller 220 exits the menu routine. If, however, the clear key is held for a time period less than T3, the controller 220 returns to the next higher level at C (FIG. 6), and displays the next sub-subheading. This allows the user to return to a higher level.

If the OK key is the first key activated, as determined in decision block 1119, the controller 220 determines whether the OK key was held for greater than period T2 in decision block 1120. If the OK key was held for a time period greater than T2, the controller 220 determines whether the item displayed in display 108 when the OK key is activated is in the short menu, as indicate in block 1124. If it is not, the controller moves the displayed heading to the short menu as indicated in block 1122. This allows items to be easily moved from the extended menu to the short menu using the OK key. If the item was in the short menu, the controller removes the item from the short menu as indicated in block 1126. This allows items to be moved from the short menu in the extended menu mode. In either case, the controller 220 then waits for one of the keys 110, 116 or 118 to be activated.

If the OK key is held for less than, or equal to, time period T2, as determined at decision block 1120, the controller selects the choice displayed on display 108, as indicated in block 1125. Following the selection of a choice in block 1125, the controller 220 will determine whether the choice requires a change of state or if the controller is to carry out a particular operation, or function. If the choice is a change of state, the controller 220 changes the state, as indicated in block 1139, and returns to show the next sub-subheading. If the choice is an operation, the controller 220 carries out the operation as indicated in block 1141, and then ends the menu routine.

If the menu key was determined to be activated in decision block 1117, the controller 220 scrolls to the next extended menu choice, as indicated in block 1127. Controller 220 then waits for actuation of the next key in decision blocks 1117, 1119, and 1121.

If it is determined in decision block 535 that the next level is a choice, the controller 220 controls display 108 to show the existing menu choice at point D (FIG. 12), as indicated in block 1215. The controller then waits for the menu key 116 to be activated in decision block 1217, the OK key to be activated in block 1219, or the clear key to be activated in decision block 1221. If the OK key, the menu key, and the clear key are not activated, the controller 220 will continue to show the existing menu choice.

If the clear key is activated first as determined in decision block 1221, the controller 220 determines whether the clear key is held for a time period greater than T3 in decision block 1223. If the clear key is held for a time period greater than T3, the controller 220 exits the menu routine. If, however, the clear key is held for a time period less than T3, the controller 220 returns to the next higher level at A (FIG. 5), and displays the next heading. This allows the user to return to a higher level.

If the OK key is the first key activated, as determined in decision block 1219, the controller 220 determines whether the OK key was held for greater than period T2 in decision block 1220. If the OK key was held for a time period greater than T2, the controller 220 determines whether the item displayed in display 108 when the OK key is activated is in the short menu, as indicate in block 1224. If it is not, the controller moves the displayed heading to the short menu as indicated in block 1222. This allows items to be easily moved from the extended menu to the short menu using the OK key. If the item was in the short menu, the controller removes the item from the short menu as indicated in block 1226. This allows items to be moved from the short menu in the extended menu mode. In either case, the controller 220 then waits for one of keys 110, 116 or 118 to be activated.

If the key is held for less than, or equal to, time period T2, as determined at decision block 1220, the controller selects the choice displayed on display 108, as indicated in block 1225. Following the selection of a choice in block 1225, the controller 220 will determine whether the choice requires a change of state or if the controller is to carry out a particular operation, or function. If the choice is a change of state, the controller 220 changes the state, as indicated in block 1239, and returns to show the next subheading. If the choice is an operation, the controller 220 carries out the operation as indicated in block 1241, and then ends the menu routine.

If the menu key was determined to be activated in decision block 1217, the controller 220 scrolls to the next extended menu choice, as indicated in block 1227. Controller 220 then waits for actuation of the next key in decision blocks 1217, 1219, and 1221.

The phone book key 112 and the message key 114 operate identically to the menu key. The phone book key is used to scroll through the phone book branch and the message key is used to scroll through he message branch. In both of these branches, the clear key is use to back up levels or to exit the branch.. The OK key is used to select items in the branches. These branches may include only a short menu since they have a small number of items therein. Alternatively, the telephone number directory, can advantageously include a short menu and an extended menu. If it has both menus, items, ion the form of telephone numbers, are moved in the same manner as described above with respect to the "menu key" mode of operation.

Figure 13:
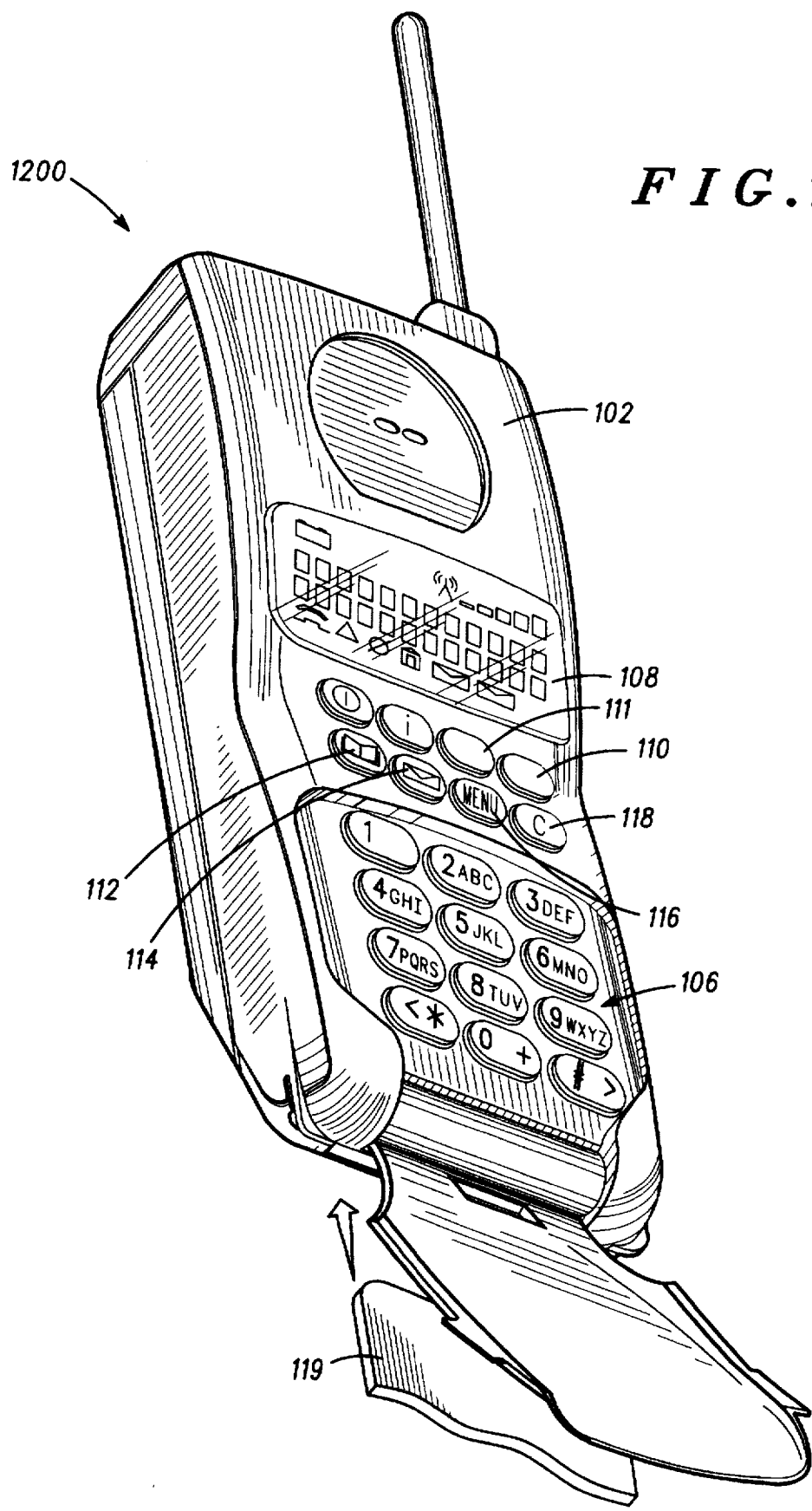
FIG. 13 is a front elevational view illustrating an alternate embodiment of the radio telephone.

According to an alternate embodiment of the invention, shown in FIG. 13, the radio telephone may include a mode key 111 dedicated to the changing between the extended menu and the short menu. This menu system would operate in substantially the same manner as described above. However, whenever the menu key is activated, the menu mode changes between the short and extended menu at the same level. Thus, if the display 108 shows a short menu heading when the mode key 111 is activated, the menu would change to the extended mode and the display would continue to show that heading.

Thus it can be seen that a menu system is disclosed which is versatile in operation and easy to use. The user can change between extended and short menus readily. Additionally, the user has a great deal of flexibility in selecting items for the short and extended menus.

What is claimed is:

1. A radio communication device menu system, comprising:

a memory storing menu information, the menu information including an extended menu comprising extended menu items and a short menu comprising short menu items, the short menu items being a subset of the extended menu items, a controller coupled to the memory;

a user controlled input coupled to the controller for manually inputting scrolling control signals and select signals to the controller, the user controlled input includes a menu key for controlling the controller to scroll through the menu items; and a display coupled to the controller to sequentially display items from the menus, wherein the controller is responsive to a predetermined select signal from the user controlled input to select one of the short menu and the extended menu for scrolling, and the controller responsive to the scrolling control signals to scroll through items in the short menu if the short menu is selected thereby causing the short menu items to be sequentially displayed in sequential screens on the display, and the controller responsive to the scrolling control signals to scroll through items in the extended menu if the extended menu is selected thereby causing the extended menu items to be sequentially displayed in sequential screens on the display, and the controller responsive to a first predetermined actuation pattern of the user controlled input to perform a function corresponding to the displayed item, and the controller responsive to a second predetermined actuation pattern of the user controlled input to move items from the extended menu to the short menu while scrolling through the extended menu items, and the controller responsive to a third predetermined actuation pattern of the user controlled input to remove items from the short menu, whereby the short menu is dynamic to include only the information desired by the user, wherein the controller enters the extended menu when the menu key is held for more than a predetermined time period.

2. The radio communication device menu system as defined in claim 1, wherein the user controlled input further includes a selection key.

3. The radio communication device menu system as defined in claim 2, wherein the controller adds a particular menu item to the short menu when the selection key is held for more than a predetermined time period while the display is displaying the particular menu item in the extended menu.

4. The radio communication device menu system as defined in claim 1, wherein the controller removes a particular menu item from the short menu when the selection key is held for more than a particular time period while the particular item is displayed.

5. The radio communication device menu system as defined in claim 1, further including a clear key which is held for a first predetermined time period to return to a higher level in the menu system and is held for a second predetermined time period to exit the menu.

6. A radio communication device menu system, comprising:

a memory storing menu information, the menu information including an extended menu comprising extended menu items and a short menu comprising short menu items, the short menu items being a subset of the extended menu items:

a controller coupled to the memory;

a user controlled input coupled to the controller for manually inputting scrolling control signals and select signals to the controller, wherein the user controlled input includes a selection key; and a display coupled to the controller to sequentially display items from the menus, wherein the controller is responsive to a predetermined select signal from the user controlled input to select one of the short menu and the extended menu to be an active menu for scrolling, and the controller responsive to the scrolling control signals to scroll through items in the short menu if the short menu is selected thereby causing the short menu items to be sequentially displayed in sequential screens on the display, and the controller responsive to the scrolling control signals to scroll through items in the extended menu if the extended menu is selected thereby causing the extended menu items to be sequentially displayed in sequential screens on the display, wherein the user controlled input includes a clear key which is held for a first predetermined time period to return to a higher level in the active menu and the clear key is held for a second predetermined time period to exit the active menu, wherein the controller enters the extended menu from the short menu when the menu key is held for more than a predetermined time period.

7. The radio communication device menu system as defined in claim 6, wherein the user controlled input includes a menu key for controlling the controller to scroll through the active menu.

8. A radio communication device menu system, comprising:
- a memory storing menu information, the menu information including an extended menu comprising extended menu items and a short menu comprising short menu items, the short menu items being a subset of the extended menu items;
- a controller coupled to the memory;
- a user controlled input coupled to the controller for manually inputting scrolling control signals and select signals to the controller, wherein the user controlled input includes a selection key; and
- a display coupled to the controller to sequentially display items from the menus, wherein the controller is responsive to a predetermined select signal from the user controlled input to select one of the short menu and the extended menu to be an active menu for scrolling, and the controller responsive to the scrolling control signals to scroll through items in the short menu if the short menu is selected thereby causing the short menu items to be sequentially displayed in sequential screens on the display, and the controller responsive to the scrolling control signals to scroll through items in the extended menu if the extended menu is selected thereby causing the extended menu items to be sequentially displayed in sequential screens on the display, wherein the user controlled input includes a clear key which is held for a first predetermined time period to return to a higher level in the active menu and the clear key is held for a second predetermined time period to exit the active menu, wherein the controller adds a particular menu item to the short menu when the selection key is held for more than a predetermined time period while the display is displaying the particular menu item in the extended menu.

9. A radio communication device menu system, comprising:
- a memory storing menu information, the menu information including an extended menu comprising extended menu items and a short menu comprising short menu items, the short menu items being a subset of the extended menu items;
- a controller coupled to the memory;
- a user controlled input coupled to the controller for manually inputting scrolling control signals and select signals to the controller, wherein the user controlled input includes a selection key; and
- a display coupled to the controller to sequentially display items from the menus, wherein the controller is responsive to a predetermined select signal from the user controlled input to select one of the short menu and the extended menu to be an active menu for scrolling, and the controller responsive to the scrolling control signals to scroll through items in the short menu if the short menu is selected thereby causing the short menu items to be sequentially displayed in sequential screens on the display, and the controller responsive to the scrolling control signals to scroll through items in the extended menu if the extended menu is selected thereby causing the extended menu items to be sequentially displayed in sequential screens on the display, wherein the user controlled input includes a clear key which is held for a first predetermined time period to return to a higher level in the active menu and the clear key is held for a second predetermined time period to exit the active menu, wherein the controller removes a particular menu item from the short menu when the selection key is held for more than a predetermined time period while the particular item is displayed.

10. A method of controlling a radio communication device comprising a memory storing menu information, the menu information including an extended menu comprising extended menu items and a short menu comprising short menu items, the short menu items being a subset of the extended menu items, a controller coupled to the memory, a user controlled input coupled to the controller for manually inputting scrolling control signals and select signals to the controller, and a display coupled to the controller to sequentially display items from the menus, the method comprising the steps of:
- selecting in the controller one of the short menu and the extended menu for scrolling responsive to a predetermined select signal from the user controlled input;
- scrolling through items in the short menu if the short menu is selected thereby causing the short menu items to be sequentially displayed in sequential screens on the display;
- scrolling through items in the extended menu if the extended menu is selected thereby causing the extended menu items to be sequentially displayed in sequential screens on the display,
- performing a function corresponding to the displayed item in the controller responsive to a first predetermined actuation pattern of the user controlled input;
- moving items from the extended menu to the short menu while scrolling through the extended menu items responsive to a second predetermined actuation pattern of the user controlled input;
- removing items from the short menu responsive to a third predetermined actuation pattern of the user controlled input whereby the short menu is dynamic to include only the information desired by the user; and
- changing from the short menu to the extended menu when a key on the communication device is held for more than a predetermined time period.

11. A method of controlling a radio communication device comprising a memory storing menu information, the menu information including an extended menu comprising extended menu items and a short menu comprising short menu items, the short menu items being a subset of the extended menu items, a controller coupled to the memory, a user controlled input coupled to the controller for manually inputting scrolling control signals and select signals to the controller, and a display coupled to the controller to sequentially display items from the menus, the method comprising the steps of:
- selecting in the controller one of the short menu and the extended menu for scrolling responsive to a predetermined select signal from the user controlled input;
- scrolling through items in the short menu if the short menu is selected thereby causing the short menu items to be sequentially displayed in sequential screens on the display;
- scrolling through items in the extended menu if the extended menu is selected thereby causing the extended menu items to be sequentially displayed in sequential screens on the display,
- performing a function corresponding to the displayed item in the controller responsive to a first predetermined actuation pattern of the user controlled input;

moving items from the extended menu to the short menu while scrolling through the extended menu items responsive to a second predetermined actuation pattern of the user controlled input;

removing items from the short menu responsive to a third predetermined actuation pattern of the user controlled input whereby the short menu is dynamic to include only the information desired by the user; and adding a particular menu item to the short menu when a selection key is held for more than a predetermined time period while the display is displaying the particular menu item in the extended menu.

12. The method as defined in claim 11, further including the step of removing a particular menu item from the short menu when the selection key is held for more than a particular time period while the particular item is displayed.

13. The method as defined in claim 11, further including a clear key which is held for a first predetermined time period to return to a higher level in the menu system and is held for a second predetermined time period to exit the menu information.

* * * * *